April 4, 1967

T. S. CHMURA 3,312,209

FUEL DELIVERY SYSTEM

Filed Nov. 12, 1964

INVENTOR:
THEODORE S. CHMURA
BY Howson & Howson
ATTYS.

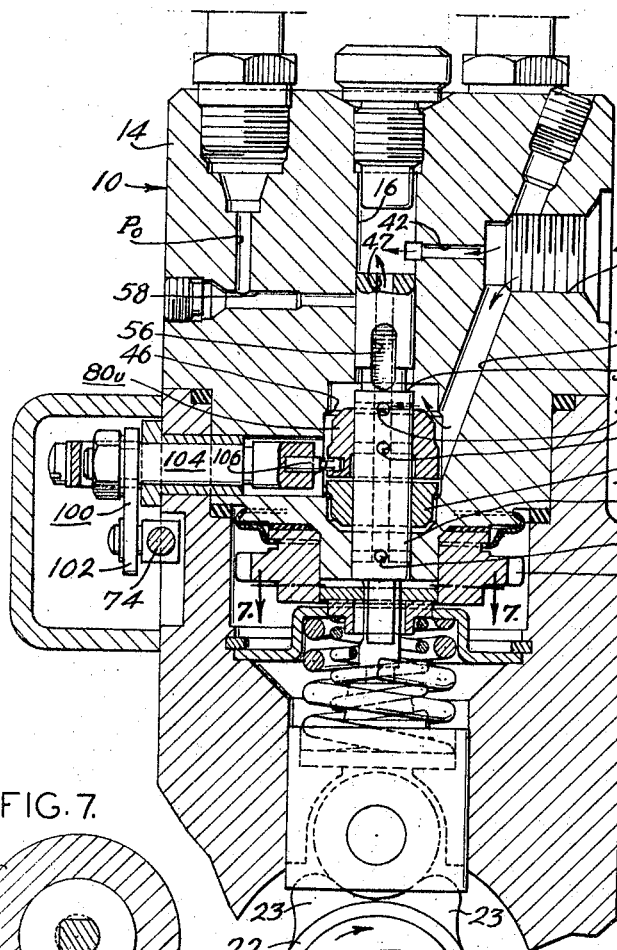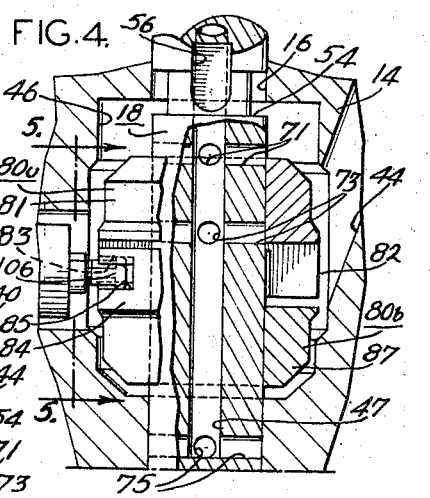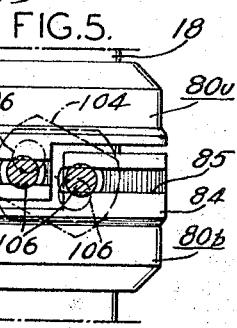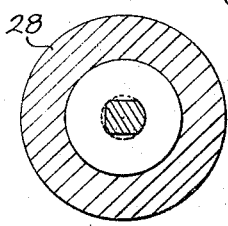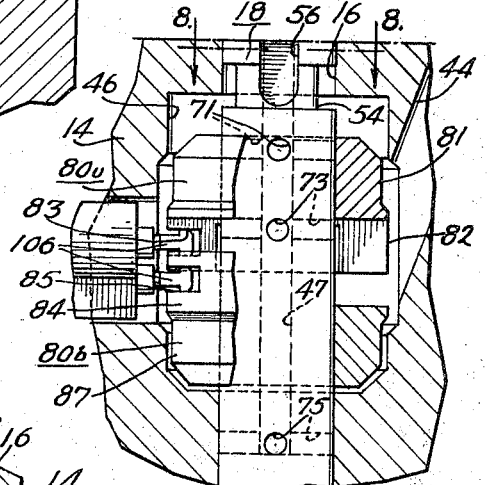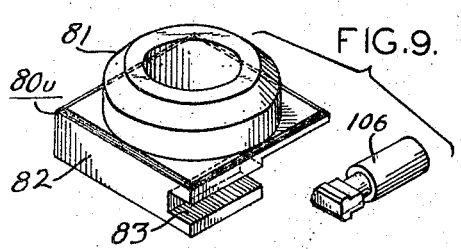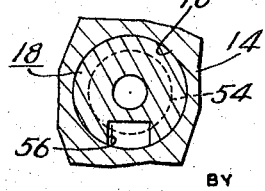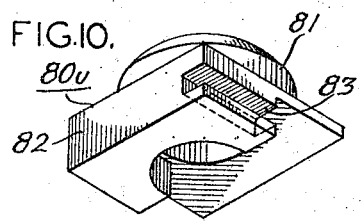

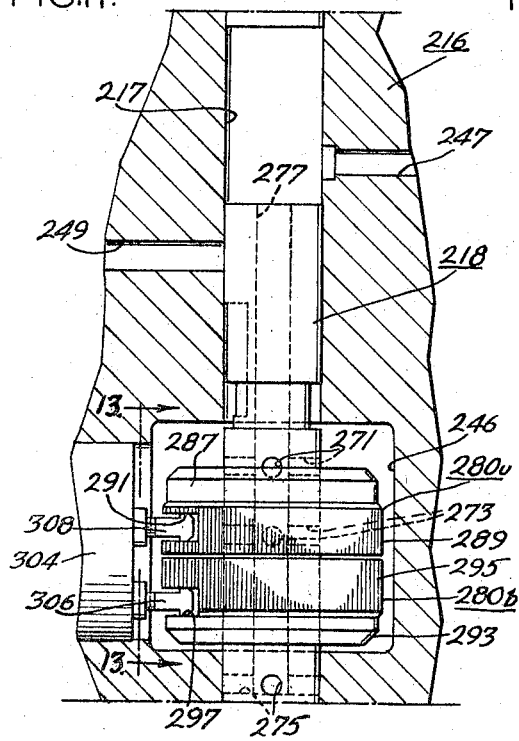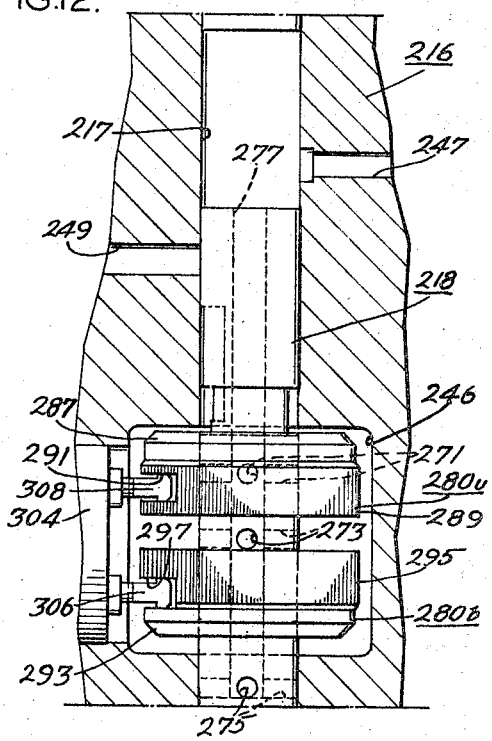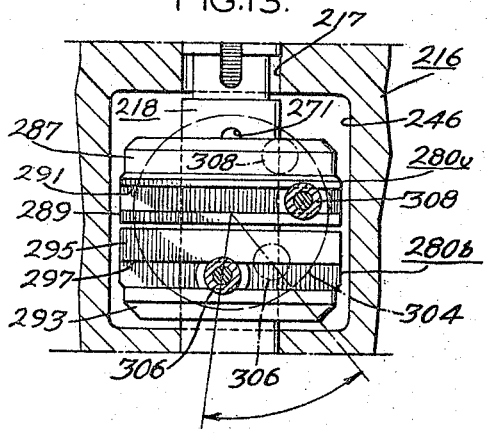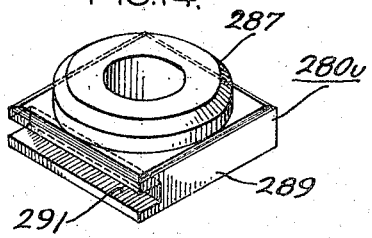

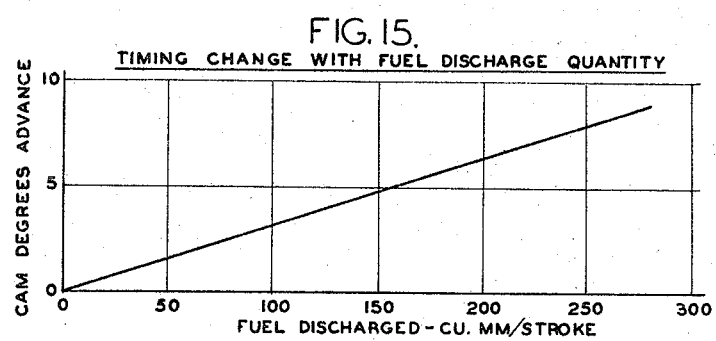
FIG. 15. TIMING CHANGE WITH FUEL DISCHARGE QUANTITY
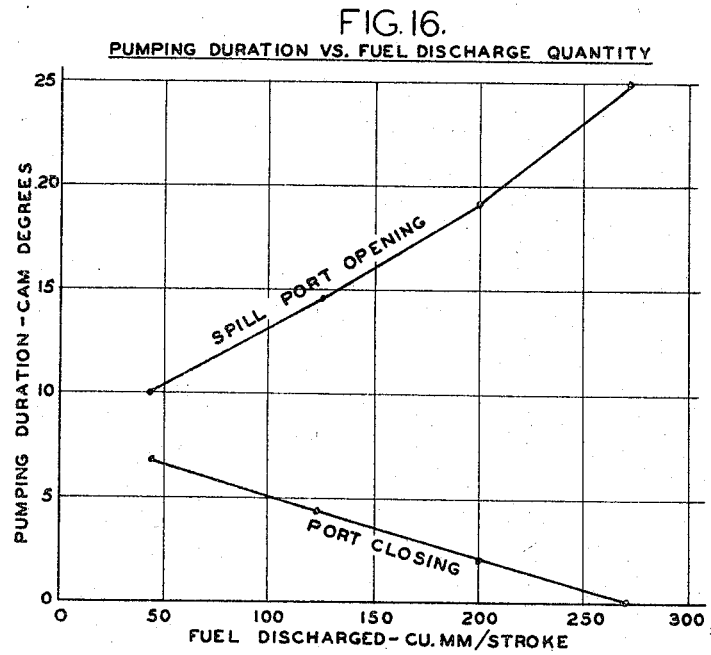
FIG. 16. PUMPING DURATION VS. FUEL DISCHARGE QUANTITY
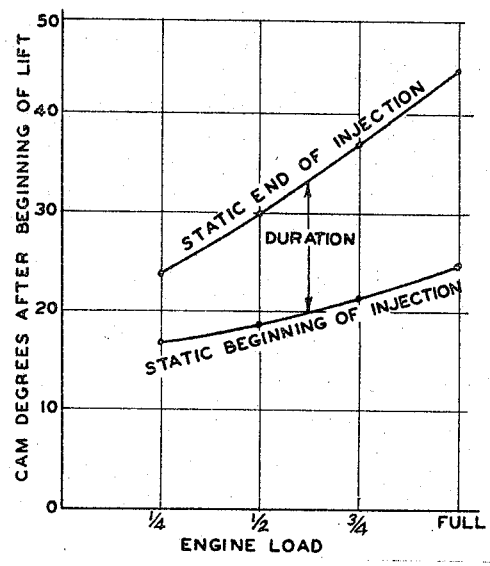
FIG. 17. INJECTION ADVANCE VS. LOAD
INVENTOR:
THEODORE S. CHMURA
BY Howson & Howson
ATTYS.

United States Patent Office 3,312,209
Patented Apr. 4, 1967

3,312,209
FUEL DELIVERY SYSTEM
Theodore S. Chmura, Chicopee, Mass., assignor to American Bosch Arma Corporation, Springfield, Mass., a corporation of New York
Filed Nov. 12, 1964, Ser. No. 410,416
6 Claims. (Cl. 123—140)

This invention relates to improvements in the fuel delivery system for internal combustion engines.

More particularly the present invention relates to new and improved means in such a fuel delivery system for controlling selectively the amount of fuel delivered and also the injection pump timing in relation to variables such as engine load.

These fuel delivery systems usually include a fuel pump and a centrifugal governor. The fuel pump may comprise a plunger mounted in a pump housing, the plunger being operatively connected to a cam shaft which is driven by the engine whereby the plunger is reciprocated and rotated to distribute predetermined quantities of fuel to the cylinders of the engine in their firing order. The governor is a speed sensitive control operatively connected to the pump and adapted to maintain engine speed within desired limits by adjusting fuel pump delivery to meet variations in load by selectively increasing or decreasing the quantity of fuel delivered by the pump.

The present invention provides control means in the form of a two-sleeve arrangement surrounding the plunger which are actuatable simultaneously axially relative to the plunger by a single control to the governor to selectively vary the quantity of fuel delivered by the pump and also to vary the injection pump timing in relation to variables such as engine load.

It has been found that for optimum performance, it is desirable to vary selectively the quantity of fuel delivered by the pump to the cylinders and also the injection timing. For example, incorrect timing can cause loss of power, smokey exhaust, sluggish or noisy combustion, excessive exhaust temperature, rough running and high fuel consumption. Thus, for example, in diesel engines operating at high mean effective pressures of 200 p.s.i. or more, smooth combustion can be obtained with a fixed timing of injection. However, when the load is decreased, the combustion becomes rougher. One form of the control means of the present invention corrects this condition by retarding the injection pump timing as the load is reduced. More specifically in this form of control means, the sleeves are moved axially in opposite directions relative to the plunger by the single control rod actuated by the governor whereby as the quantity of fuel discharge per stroke by the pump increases, the beginning of injection is advanced and the end of injection is retarded.

In gasoline engines it has been found advantageous to retard the beginning of injection as the load increases to improve ignition. This characteristic is obtained with another form of control means in accordance with the present invention whereby the sleeves are actuated through the control rod by the governor in the same direction axially relative to the plunger and also relative to one another.

With the foregoing in mind an object of the present invention is to provide control means for a fuel delivry system wherein quantity of fuel and also injection pump timing are automatically and simultaneously varied in response to certain variables such as engine load to improve engine performance.

Another object of the present invention is to provide a control means in the fuel delivery system comprising two sleeves circumscribing the pump and plunger which are operable by a single operator control connected to the governor to selectively actuate the sleeves in opposite directions to vary selectively the quantity of fuel delivered per stroke and also vary selectively the injection timing.

A further object of the present invention is to provide a two-sleeve control selectively actuatable relative to the plunger by a single operator connected to the governor which effects an increase in the quantity of fuel delivered and simultaneously a timing advance when the load on the engine increases and a retard in the timing when the engine load decreases, whereby smooth operation is effected with less knocking.

Still another object of the present invention is to provide a two-sleeve, single control arrangement of the type described above, which effects a retard in the timing as load decreases, thereby reducing the peak combustion pressures at high speed and part load operating conditions thereby obviating the need for external timing mechanisms.

A further object of the present invention is to provide a two-sleeve, single control mechanism wherein the sleeves are adapted for actuation in the same direction axially relative to the plunger and axially relative to one another to effect an injection or timing advance as fuel quantity is reduced and a retard in the injection as load increases to improve ignition in gasoline operated engines.

These and other objects of the present invention and the various features and details of the construction and operation thereof are hereinafter more fully set forth with reference to the accompanying drawings, wherein:

FIG. 2 is an enlarged sectional view through the pump taken on lines 2—2 of FIG. 1;

FIG. 4 is an enlarged fragmentary sectional view showing the two-sleeve control means for effecting selective variation in quantity of fuel delivered and injection timing in accordance with the present invention;

FIG. 5 is an enlarged side view taken along lines 5—5 of FIG. 4;

FIG. 6 is an enlarged sectional view similar to FIG. 4 showing the position of the sleeves at maximum fuel delivery;

FIG. 7 is an enlarged sectional view taken on lines 7—7 of FIG. 2;

FIG. 8 is an enlarged sectional view taken on lines 8—8 of FIG. 6;

FIGS. 9 and 10 are perspective views showing one of the control sleeves and one of the pin actuators;

FIG. 11 is an enlarged fragmentary sectional view of another embodiment of two-sleeve control arrangement in accordance with the present invention;

FIG. 12 is an enlarged fragmentary sectional view similar to FIG. 11 showing the sleeves in a separated position;

FIG. 13 is a view taken on lines 13—13 of FIG. 11;

FIG. 14 is a perspective view of one of the control sleeves;

FIG. 15 is a chart showing timing change with fuel discharge quantity with the two-sleeve control arrangement shown in FIGS. 1–10;

FIG. 16 is a chart showing pump duration versus fuel discharge quantity with the two-sleeve control arrangement shown in FIGS. 1–10 inclusive; and FIG. 17 is a chart of injection advance versus load with a two-sleeve arrangement as shown in FIGS. 11–14 inclusive.

Figure 1:
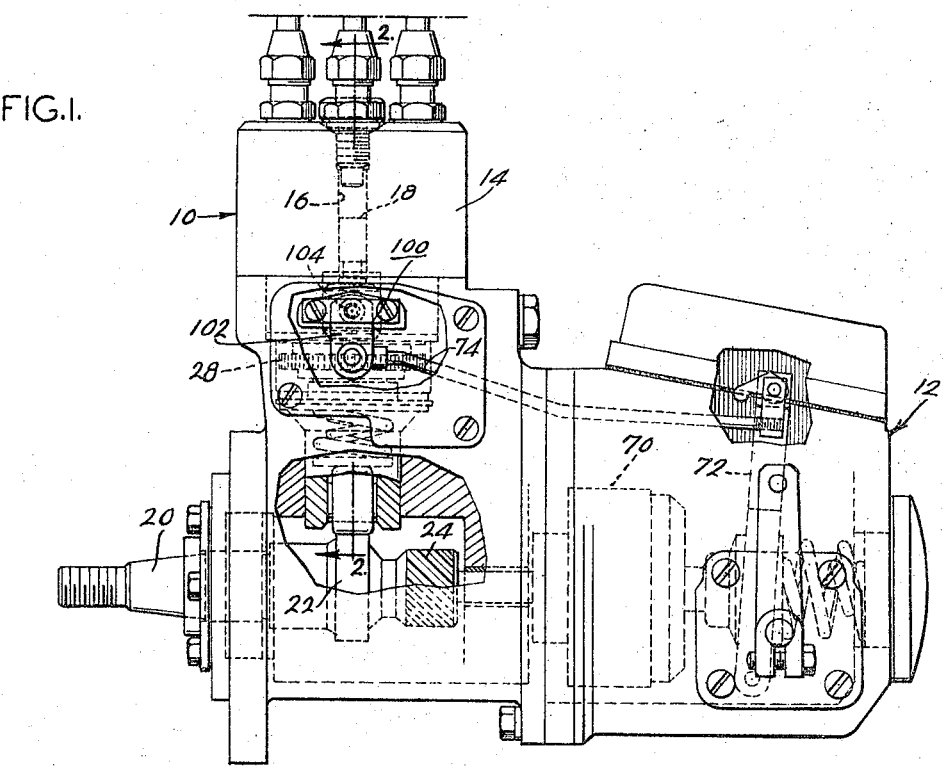
FIG. 1 is a side elevational view partly in section of a pump and a centrifugal governor incorporating the fuel delivery control means in accordance with the present invention.

Referring now to the drawings and particularly to

FIG. 1 thereof, there is shown a fuel delivery system incorporating control means in accordance with the present invention, the fuel delivery system including a fuel injection pump 10 and a centrifugal governor 12.

The general construction of the fuel injection pump 10 is generally of the type shown in Patent No. 2,965,087 reference being made thereto for details and includes a housing 14 having a central fuel chamber 16 therein and a fuel distribution plunger 18 mounted in the fuel chamber 16. The plunger 18 is operatively connected to a cam shaft 20 which is driven by an associated internal combustion engine and which cam shaft 20 effects reciprocating and rotating movement of the plunger 18 in the fuel chamber 16 to distribute fuel to the cylinders of the engine in their firing order. The cam shaft 20 mounts a cam 22 having a predetermined selected number of lobes 23 thereon to effect reciprocating movement of the plunger 18, and the cam shaft 20 also mounts a spiral gear 24 which through suitable connections including a spur gear 28 rotates the plunger 18 to selectively supply fuel to the various cylinders of the engine.

Figure 3:
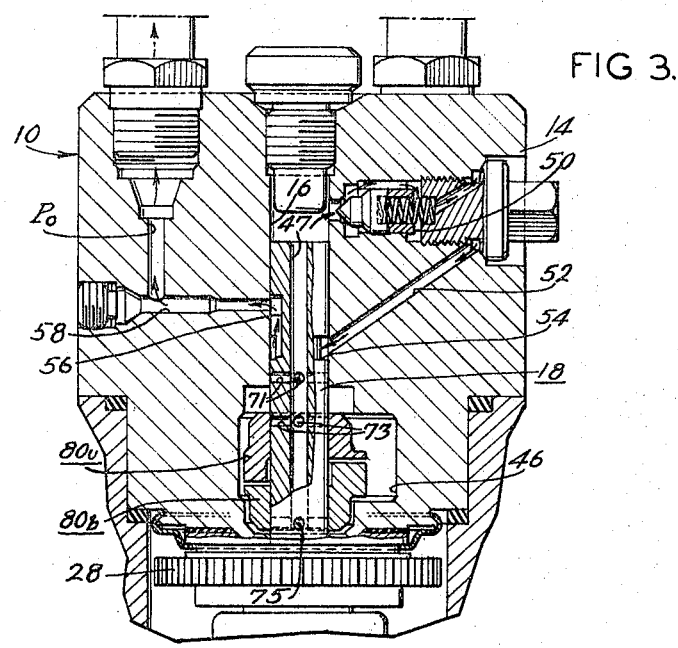
FIG. 3 is an enlarged sectional view through the pump showing the path of fuel delivery.

Considering now briefly the operation of the pump, fuel is supplied to the fuel pump from a supply source through a port 40 which has channels 42 and 44 communicating respectively with the fuel distribution chamber 16 and the sump 46 as shown in FIG. 2. Now, with respect to FIG. 3, when the plunger 18 is driven upwardly in the chamber 16, the pressure of the fuel ahead of plunger 18 builds up whereby the spring loaded fuel delivery valve 50 is opened to permit passage of the fuel through the valve and the duct 52 to an annulus 54 in the plunger and then through the vertical distributing slot 56 on the plunger to one of a series of outlet ducts 58 with which the distributing slot 56 is then registered. From there the fuel is delivered through one of a series of outlet ports $P_o$ to one of the cylinders of the engine. Fuel delivery to a given cylinder is cut off when one of several axially spaced radial openings 71, 73, 75 in the plunger is in communication with the sump 46 whereby the fuel under pressure passes through the vertical bore 47 in the center of the plunger and into the sump which is at supply pressure. Accordingly, with the lapse of pressure the delivery valve 50 then closes to terminate delivery of fuel. The cam shaft 22 continuously effects reciprocating movement of the plunger and rotation thereof to deliver fuel to the various cylinders of the engine in their firing order in the manner described above.

The centrifugal governor 12 which is operatively associated with the fuel pump 10 is a speed sensitive member and serves normally to maintain the engine speed within desired limits by automatically adjusting the quantity of fuel delivered by the pump to meet variations in load. In performing its duty the governor fulfills two functions, namely the governor serves as a speed indicator to measure the engine speed, and it acts as a power mechanism to actuate the fuel control whenever a speed change occurs. The governor may be of the type shown in application Ser. No. 261,325 and which comprises a flyweight assembly 70, mounted on the cam shaft and a spring biased fulcrum lever 72. The fulcrum lever 72 pivots in the direction indicated in response to speed changes of the engine due for example to variations in load. The fulcrum lever 72 is connected to control means in accordance with the present invention by means including a control rod 74 whereby quantity of fuel and the injection timing cycle may be varied in response to pivotal movement of the fulcrum lever 72.

It has been found that for optimum engine performance, it is desirable to vary selectively the quantity of fuel delivered by the pump to the cylinders and also the injection timing. For example, incorrect timing can cause loss of power, smokey exhaust, sluggish or noisy combustion, excessive exhaust temperature, rough running and high fuel consumption. Injection timing is dependent on injection lag, ignition lag, engine speed and combustion characteristics of the engine. Further it has been found that optimum timing depends on a number of factors and may change depending on the type of engine involved. Other factors involved in optimum timing are the type of combustion chamber and the engine speed. For example, for open and turbulence chamber engines, the injection is timed so that combustion starts at or very close to top center. With energy-cell engines having two-stage combustion more injection advance is required. Generally, more exact timing is required for open chamber and energy-cell engines than for pre-combustion and turbulence chamber engines.

Variable injection timing is desirable for automotive diesel engines operating over a wide speed range. Timing should be arranged at high speeds so that the ignition will not be delayed nor combustion be incomplete and it should be retarded at low speeds for improved starting to permit slower idling and lessen combustion knock. In locomotive and marine service where the engine load increases with the speed, it is desirable to retard the injection timing with decrease in the load. This gives fully advance timing at rated speed for efficient full load performance and a retarded timing at low speeds and reduced loads give smoother running at these conditions.

With the foregoing in mind, an object of the present invention is to provide a control means for a fuel delivery system whereby the injection timing and fuel discharge quantity may be selectively varied depending on the type of engine and in response to changes in operating conditions. For example, the control means illustrated in the embodiment of FIGS. 1–10 inclusive is especially useful in fuel delivery systems for diesel engines. In accordance with this form of the invention, the control means comprises a pair of sleeves circumscribing the plunger 16, an upper sleeve $80_u$ and a lower sleeve $80_b$. As best illustrated in FIGS. 9 and 10, the upper sleeve $80_u$ comprises an annular portion 81 and a generally square depending platform 82 which is of a stepped configuration and has a groove 83 in a sidewall thereof. The lower sleeve $80_b$ has a generally square stepped platform 84 with a groove 85 in the sidewall and a depending annular portion 87. The sleeves $80_u$ and $80_b$ are mounted around the plunger so that the platforms nest and the grooves 83 and 85 in side faces thereof are aligned in a common plane.

In the present instance, the sleeves are actuatable axially in opposite directions relative to the plunger 18 through a linkage system 100 connected to the fulcrum lever of the governor. More specifically, the linkage system includes the control rod 74 connected at one end to the free terminal end of the fulcrum lever 72 and which at its opposite end mounts a connecting link 102 which in turn is connected to a stub shaft 104 rotatably mounted in the housing 14 of the pump. The stub shaft 104 mounts a pair of pins 106 at its inner terminal end which engage in the groves 83 and 85 of the sleeves $80_u$ and $80_b$. (See FIG. 5.) The axial height of the sleeves $80_u$ and $80_b$ and the radial ports 71, 73 and 75 are in a predetermined relation so that when the plunger is in its lowermost position as shown in FIG. 2 and the sleeves $80_u$ and $80_b$ are in contact with each other, the radial port 71 communicates with the sump 46. In this position of the parts there is no fuel discharge through the delivery valve since there is a direct flow passage from the top of the fuel chamber through the central bore and radial port 71 to the sump. In other words, in this position no fuel pressure can build up in the chamber 16 in front of the plunger and there is no fuel delivery by the pump. In order to obtain fuel discharge by the pump, the sleeves $80_u$ and $80_b$ are moved axially relative to the plunger in opposite directions through the linkage system connected to the fulcrum lever. It is noted that the fulcrum lever may be actuated in a direction to increase the quantity of fuel delivered by the pump to separate the sleeves either manually or automatically during operation of the engine in response to changes in engine speed, for example, due to increased or decreased load on the engine. Maximum quantity of fuel discharged by the pump for each cycle occurs when the sleeves are at their maximum distance apart as shown in FIG. 6. In this position the ports 71, 73, and 75 are closed or covered during actuation of the plunger for the longest period of time.

Considering now the operation of the fuel delivery system incorporating the control means in accordance with the present invention, the two-sleeve arrangement actuated by a single control element controls the quantity of fuel delivered for each cycle of the plunger and also controls the injection timing in a predetermined relation to the quantity of fuel delivered. For example, assume that the fulcrum lever 72 has been moved to a predetermined position in a direction to increase the quantity of fuel delivered by the pump by either a speed change automatically or manually. In the present instance, this causes the sleeves $80_u$ and $80_b$ to move axially in opposite directions relative to the plunger. The beginning of injection or fuel discharge by the pump is determined by the position of the lower sleeve $80_b$ since it controls the closing of the lowermost axial port 75 in the plunger as the plunger moves upward during its pumping cycle. Accordingly, as the lower sleeve $80_b$ is moved downwardly and the upper sleeve $80_u$ moves upwardly simultaneously through the linkage system as motivated by the fulcrum lever in a direction to increase fuel, this effects earlier closing of axial port 75 to also advance the beginning of injection relative to the rotation of the pump cam shaft. FIG. 15 shows a typical curve of injection timing advance as a function of the fuel discharge for a pump incorporating the present invention. Similarly the end of injection for each stroke of plunger 18 is determined by the position of the upper sleeve $80_u$ since it controls the plunger lift at which the cross axial port 73 is uncovered which is referred to as spill port opening. In other words, as the fuel quantity discharged is increased by moving the upper sleeve $80_u$ upwardly and the lower sleeve $80_b$ downwardly, the spill port opening occurs later in the plunger stroke as shown in FIG. 16. Thus, as the quantity of fuel discharged per stroke from the pump increases, the beginning of injection as indicated by port closing is advanced and the end of injection as determined by spill port opening is retarded. It is noted that the quantity of fuel increase, the beginning of injection advance and the end of injection retard are in direct relation to the amount the sleeves $80_u$ and $80_b$ are separated. In other words, as the sleeves $80_u$ and $80_b$ are farther moved apart from a closed position, the quantity of fuel delivered by the pump increases, the beginning of injection advances and the end of injection is further retarded. This is an especially desirable feature in diesel engines which is accomplished in the present invention through the use of a single control linkage system and the two-sleeve arrangement which automatically varies injection timing in relation to quantity of fuel delivered by the pump.

There is illustrated in FIGS. 11–14 inclusive another form of two-sleeve arrangement in accordance with the present invention which is especially useful in fuel delivery systems for gasoline engines to effect automatic variation in the injection timing as the quantity of fuel delivered by the pump is varied.

The components of the fuel delivery system are the same as described previously and include a pump, a governor, and a linkage connecting the two-sleeve fuel quantity and timing control means of the pump to the fulcrum lever of the governor. The general construction of the pump and operation thereof are substantially identical to the arrangement described above. Thus, the pump includes a housing 216 having a fuel distribution chamber 217 and a plunger 218 mounted in the fuel distribution chamber 217. The plunger 218 is connected to the engine cam shaft for reciprocating and rotational movement in the chamber 217 to effect delivery of fuel to the various cylinders in the engine. The plunger 218 includes three radial ports 271, 273, and 275 which communicate with a central axial bore 277 in the plunger, the ports 271, 273, and 275 as illustrated being axially spaced apart in a predetermined relation. The pump further includes a sump chamber 246 and a passageway 247 in the housing communicating with the fuel distribution chamber 217 and connected to a suitable fuel supply and a passageway 249 also communicating with the fuel distribution chamber 217 and the cylinders of the engine. In the present instance, the timing and quantity control means comprises a pair of sleeves, and upper sleeve $280_u$ and a lower sleeve $280_b$. The upper sleeve $280_u$ comprises an annular portion 287 and a generally square platform 289 depending from the annular portion having a groove 291 in a side wall thereof. The lower sleeve $280_b$ also comprises an annular portion 293 and a generally square platform 295 having a groove 297 in a side wall thereof. In the assembled relation illustrated, the platforms of the sleeves are in confronting relation.

As in the previously described embodiments, when the sleeves $280_u$ and $280_b$ are close together in the position shown in FIG. 11, there is no fuel delivery by the pump and maximum fuel delivery is when the sleeves $280_u$ and $280_b$ are at a maximum distance apart as shown in FIG. 12.

In the present instance, the sleeves are mounted for axial movement in the same direction relative to the plunger through a linkage system to the fulcrum lever. However, the upper sleeve $280_u$ is adapted for greater axial movement than the lower sleeve $280_b$. To this end there is provided a control linkage which is identical to that described above and includes a stub shaft 304 having a pair of pins 308 and 306 which engage respectively in the grooves 291 and 297 of the sleeves. However, in the present instance, the lower pin 306 engages in the groove 297 in a plane slightly to one side of the axis of the plunger and the pin 308 engages in the groove 291 at a point slightly above a plane 90° to the axis of the plunger when the sleeves are in their closed position as shown in FIG. 13. By this arrangement as the stub shaft 304 rotates in a counterclockwise direction with respect to FIG. 13, both sleeves are moved upwardly relative to the plunger and the upper sleeve is moved a greater distance than the lower sleeve.

Consider now the operation of the pump with the two-sleeve control arrangement described above and assume that the sleeves are in the position shown in FIG. 11. In this position there is no fuel delivery since the uppermost port 271 communicates with the sump 246 and therefore there is no pressure build up in the fuel distribution chamber 217 in front of the plunger. Now, as the fulcrum lever is moved in a direction to increase fuel, the stub shaft is rotated in a counterclockwise direction with respect to FIG. 13 whereby the sleeves are moved axially upwardly in the direction relative to the plunger 218 and as noted above, the upper sleeve moves a greater distance than the lower sleeve. By this arrangement the quantity of fuel delivered by the pump and the injection timing are varied as shown in the chart illustrated in FIG. 17. By this arrangement injection occurs earlier and is most advanced at one-quarter load and as the load is increased, the beginning of injection is further retarded. This characteristics is especially desirable in fuel delivery systems in gasoline engines to improve ignition at light loads.

While particular embodiments of the present invention have been illustrated and described herein, it is not intended to limit the invention and changes and modifications may be made therein within the scope of the following claims.

I claim:

1. A pump for delivering fuel to cylinders of an engine comprising a housing, a fuel distribution chamber in said housing, a sump surrounding said fuel distribution chamber and in communication therewith, a plunger mounted in said fuel distribution chamber, fuel supply passageway means in said housing communicating with a fuel supply and said fuel distribution chamber, discharge passageway means communicating with said fuel distribution chamber and the cylinders of the engine, said plunger adapted for reciprocating and rotating movement in said fuel distribution chamber and operable upon reciprocating movement in one direction to effect flow of fuel under pressure from the supply passageway means to the cylinders of the engine in a predetermined order through the discharge fuel passageway means, at least three axially spaced radial ports in said plunger providing flow paths between said fuel distribution chamber and said sump adapted to communicate with the sump and the fuel distribution chamber at a predetermined position of the plunger in its reciprocating stroke to effect cutoff of the fuel delivery from said supply passageway means to said discharge passageway means, a pair of sleeves surrounding said plunger and disposed in the sump, a single actuator for actuating the sleeves simultaneously relative to one another and to the plunger in opposite directions whereby during the pumping stroke of the plunger in said one direction the sleeves are actuated axially relative to one another in relation to increased load so that the quantity of fuel discharge per stroke increases and the beginning of injection is advanced and the end of the injection is retarded upon increase of load on the engine.

2. A pump as claimed in claim 1 wherein each of said sleeves has a groove therein and wherein the actuating means comprises a rotatably mounted member in the housing having a pair of projecting pins which engage in the grooves of the sleeves whereby rotation of said member effects axial movement of the sleeves relative to the plunger.

3. A pump as claimed in claim 2 wherein said grooves and pins are disposed relative to one another so that upon rotation of said member, said sleeves are simultaneously actuated for equal incremental movement in opposite axial directions relative to one another.

4. A pump as claimed in claim 1 wherein said actuating means is adapted to effect equal axial movement of the sleeves in opposite directions relative to one another.

5. A fuel delivery system for an engine having a governor and a pump having a housing, a fuel distribution chamber in said housing, a sump surrounding said fuel distribution chamber and in communication therewith, a plunger mounted in said fuel distribution chamber, fuel supply passageway means in said housing communicating with a fuel supply and said fuel distribution chambers, discharge passageway means communicating with said fuel distribution chamber and the cylinders of the engine, said plunger adapted for reciprocating and rotating movement in said fuel distribution chamber and operable upon reciprocating movement in one direction to effect flow of fuel under pressure from the supply passageway means to the cylinders of the engine in a predetermined order through the discharge fuel passageway means, at least three axially spaced radial ports in said plunger providing flow paths between said fuel distribution chamber and said sump adapted to communicate with the sump and the fuel distribution chamber at a predetermined position of the plunger in its reciprocating stroke to effect cutoff of the fuel delivery from said supply passageway means to said discharge passageway means, a pair of sleeves surrounding said plunger and disposed in the sump, a single actuator connected to said governor for actuating the sleeves simultaneously relative to one another and to the plunger in opposite directions whereby during the pumping stroke of the plunger in said one direction the sleeves are actuated axially relative to one another in relation to increased load so that the quantity of fuel discharge per stroke increases and the beginning of injection is advanced and the end of injection is retarded upon increase of load on the engine.

6. A fuel delivery system as claimed in claim 5 wherein said governor includes a fulcrum lever adapted for pivotal movement in one direction to increase fuel delivered by the pump and in the opposite direction to decrease the fuel delivered by the pump and wherein said actuating means is connected to said fulcrum lever by a linkage system, pivotal movement of said fulcrum lever in a direction to increase fuel operable to effect through said actuating means equal axial movement of the sleeves in opposite directions relative to one another.

References Cited by the Examiner
UNITED STATES PATENTS

| 2,624,327 | 1/1953 | Hogeman | 123—140 |
| 2,674,236 | 4/1954 | Humber | 123—139 |

MARK NEWMAN, *Primary Examiner.*

LAURENCE M. GOODRIDGE, *Examiner.*